United States Patent [19]

Menon

[11] Patent Number: 5,778,515
[45] Date of Patent: Jul. 14, 1998

[54] METHODS OF FABRICATING ELECTROCHEMICAL CELLS

[75] Inventor: Krishna Menon, Henderson, Nev.

[73] Assignee: Valence Technology, Inc., Henderson, Nev.

[21] Appl. No.: 838,634

[22] Filed: Apr. 11, 1997

[51] Int. Cl.$^6$ .............. H01M 2/16; H01M 10/40
[52] U.S. Cl. ........................ 28/623.4; 156/308.6
[58] Field of Search ............... 29/623.4; 156/308.6

[56] References Cited

U.S. PATENT DOCUMENTS

| | | | |
|---|---|---|---|
| 5,286,339 | 2/1994 | Klink | 29/623.4 X |
| 5,597,662 | 1/1997 | Isaacson et al. | 29/623.4 X |
| 5,681,357 | 10/1997 | Eschsach et al. | 29/623.4 X |

*Primary Examiner*—Michael Lusignan
*Attorney, Agent, or Firm*—Robert Krebs

[57] ABSTRACT

Superior bonding of an electrode layer to a separator layer can be achieved by applying a coat of pre-lamination solvent on the surface of the electrode and/or separator prior to attachment in fabricating electrochemical cells. The amount of solvent added is effective to dissolve at least a portion of the polymer material on the surface coated so that upon attachment the electrode and separator layers develop excellent adhesion. Preferred pre-lamination solvent has a boiling point higher than about 50° C. at 760 mm of Hg. Preferred pre-lamination solvents include, for example, N,N-dimethyl formamide, N,N-dimethylacetamide, 1,3-dioxolane dioxane, methyl ethyl ketone, and mixtures thereof. Acetone can be included in the pre-lamination solvent.

32 Claims, 1 Drawing Sheet

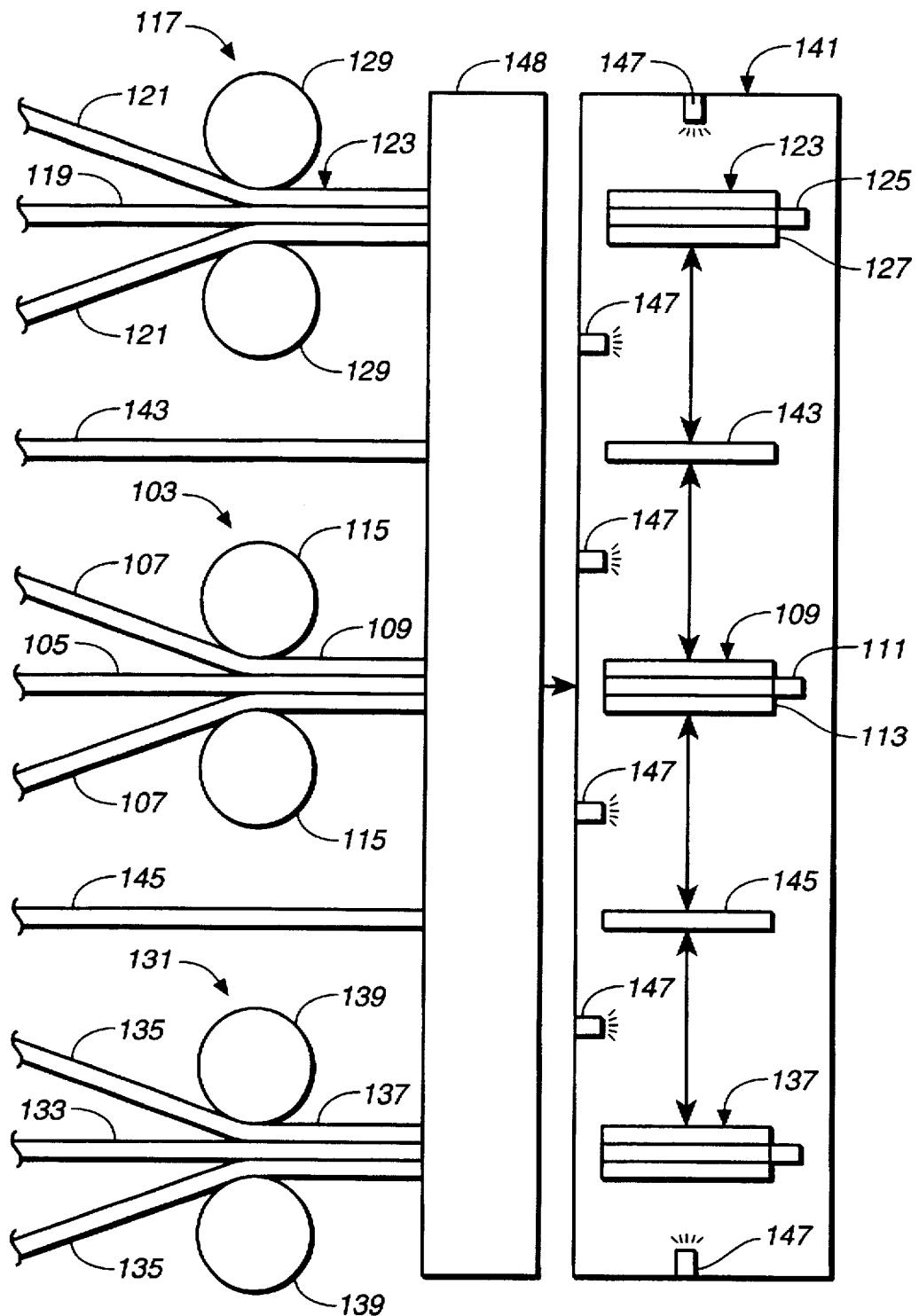
FIG._1

METHODS OF FABRICATING ELECTROCHEMICAL CELLS

FIELD OF THE INVENTION

The present invention relates to electrochemical devices and, more particularly, to methods of fabricating electrode/separator assemblies that demonstrate superior adhesion.

BACKGROUND OF THE INVENTION

Electrochemical cells comprise a cathode, an anode and an electrolyte interposed therebetween. The electrochemical cells are often defined as liquid or solid cells and this refers merely to whether the electrolyte interposed between the anode and the cathode is a liquid or a solid. Solid electrochemical cells are well known in the art and present many advantages over conventional liquid batteries such as improved safety features, lighter weight, etc. Non-aqueous lithium electrochemical cells are discussed in U.S. Pat. Nos. 5,540,741, 5,460,904, 5,441,830, 5,028,500, 4,668,595, and 4,472,487.

The anode comprises a compatible anodic material which is any material which functions as an anode in an electrochemical cell. Such compatible anodic materials are well known in the art and include, by way of example, lithium, lithium alloys, such as alloys of lithium with aluminum, mercury, nickel, zinc, and the like, and intercalation based anodes such as carbon, $WO_3$, and the like.

The cathode comprises a compatible cathodic material which refers to any material which functions as a positive pole (cathode) in an electrochemical cell. Such compatible cathodic materials are well known in the art and include, by way of example, manganese dioxide, molybdenum trioxide, sulfides of titanium and niobium, chromium oxide, copper oxide, vanadium oxides such as $V_2O_5$, $V_6O_{13}$, $LiV_3O_8$ and the like. The particular compatible cathodic material employed is not critical. When the electrochemical cell is a secondary cell, then the compatible cathodic material employed is one which is capable of being recharged (e.g., $LiV_3O_8$, $V_6O_{13}$, $MoO_3$, and the like).

Composite electrode refers to cathodes and anodes wherein the cathode is comprised of materials other than compatible cathodic materials and the anode is comprised of materials other than compatible anodic materials. Typically, the composite electrode contains a polymer which acts to bind the composite materials together and an electrolytic solvent. Composite electrodes are well known in the art. For example, a composite cathode can comprise a compatible cathodic material, a conductive material, an electrolytic solvent, an alkali salt, and a solid matrix forming polymer. Similarly, for example, a composite anode can comprise a compatible intercalation anodic material, an electrolytic solvent and a solid matrix forming polymer.

When fabricating electrochemical cells, the anode, cathode, and separator (or solid electrolyte) layers can be prepared separately on substrates and thereafter laminated together before the cells are activated. Although this method of preparing cells has been satisfactory, nevertheless, electrode films made by this process often do not adhere well to the separator layer upon lamination. Accordingly, the art is in search of improved techniques for fabricating electrochemical cells that demonstrate superior adhesion, especially techniques that can be employed in mass production.

SUMMARY OF THE INVENTION

The present invention is based, in part, on the discovery that superior bonding of an electrode layer to a separator layer can be achieved by applying a pre-lamination solvent on the surface(s) of the electrode and/or separator prior to attachment. The amount of solvent added is effective to dissolve or solvate at least a portion of the polymer material on the surface so that upon lamination the electrode and separator layers develop excellent adhesion.

In one aspect, the invention is directed to a method of preparing an electrode/separator assembly that includes the steps of:

forming an electrode film that comprises a first polymer and an electrode active material;

forming a separator film that comprises a second polymer; and attaching the electrode film to the separator film by a process comprising:

(i) placing a pre-lamination solvent on either a first surface of the electrode film, first surface of the separator film, or on both surfaces, wherein the pre-lamination solvent is effective in solvating polymer on the surface of either film; and (ii) placing the first surface of the electrode film in contact with the first surface of the separator film.

In another aspect, the invention is directed to a method of fabricating an electrochemical cell including an anode, a cathode, and a polymeric separator layer positioned between the anode and the cathode which includes the steps of:

(a) preparing a cathode film comprising a cathode active material and a first polymer;

(b) preparing a separator film that comprises a second polymer;

(c) preparing a cathode/separator assembly by a process that comprises the steps of:

(i) placing a pre-lamination solvent on either a first surface of the cathode film, first surface of the separator film, or both surfaces, wherein the pre-lamination solvent is effective in solvating polymer on the surface of the either film; and (ii) placing the first surface of the cathode film in contact with the first surface of the separator film; and (d) attaching an anode film comprising an anode active material and a third polymer to a surface of the separator of the cathode/separator assembly.

In yet another aspect, the invention is directed to a method of fabricating an electrochemical cell including an anode, a cathode, and a polymeric separator layer positioned between the anode and the cathode which includes the steps of:

(a) preparing an anode film comprising an anode active material and a first polymer;

(b) preparing a separator film that comprises a second polymer;

(c) preparing an anode/separator assembly by a process that comprises the steps of:

(i) placing a pre-lamination solvent on either a first surface of the anode film, first surface of the separator film, or both surfaces, wherein the pre-lamination solvent is effective in solvating polymer on the surface of the either film; and (ii) placing the first surface of the anode film in contact with the first surface of the separator film; and (d) attaching a cathode film comprising a cathode active material and a third polymer to a surface of the separator of the anode/separator assembly.

In a preferred embodiment, the pre-lamination solvent has a boiling point that is greater than about 50° C. at 760 mm of Hg. Preferred pre-lamination solvents include, for example, N,N-dimethylformamide, N,N-dimethylacetamide, 1,3-dioxolane, dioxane, methyl ethyl ketone, and mixtures thereof. In another preferred embodiment, acetone is included in the pre-lamination solvent.

BRIEF DESCRIPTION OF THE DRAWINGS

FIG. 1 is a schematic view of an embodiment of an apparatus for preparing an electrochemical cell.

DETAILED DESCRIPTION OF THE PREFERRED EMBODIMENTS OF THE INVENTION

The present invention is directed to a method of preparing a composite electrode/separator (or electrode) assembly that is suitable for use in electrochemical devices, and particularly for use in electrochemical cells and batteries. Preferred electrochemical cells include: a composite cathode comprising an active material and polymeric binder, a composite anode comprising an intercalation based carbon anode and polymeric binder, with each electrode capable of reversibly incorporating (e.g., intercalating) an alkali metal ion, and an electrolyte comprising a polymeric matrix containing an electrolyte solution comprising an organic electrolyte solvent and a salt of the alkali metal. Particularly preferred electrochemical cells and batteries use lithium and salts thereof.

A critical aspect of the present invention is that in attaching the anode or cathode to the separator (or solid electrolyte) layer, a pre-lamination solvent is applied to the surface(s) of the electrode and/or separator before attaching the layers. This technique improves the adhesion of the layers.

However, prior to describing this invention in further detail, the following terms will be defined.

The term "pre-lamination solvent" refers to an organic solvent that is effective in solvating polymer binding material on the surface(s) of an electrode and/or separator layer. The function of the pre-lamination solvent is to create a tacky surface on the electrode and/or separator so that they will adhere strongly together. This feature is particularly suited for electrochemical cell/battery assembly machines wherein electrode and separator layers are laminated. During the fabrication process, the electrode/separator can be maneuvered (e.g., stacked or lifted) by manipulating the electrode or separator so it is important that the non-supported parts not become detached.

The amount of pre-lamination solvent applied, e.g., sprayed, onto the surface will depend on the a number of factors including, for example, the surface area ($cm^2$), the specific pre-lamination solvent(s) employed, and the solubility of the polymer binder material. Pre-lamination generally takes place at ambient temperature. Typically, the amount of pre-lamination solvent sprayed on a surface is about 10 µL/$cm^2$ to 100 µL/$cm^2$ and more preferably about 20 µL/$cm^2$ to 60 µL/$cm^2$. The solvent will set in a few seconds, typically about 2 seconds.

In the production of the electrochemical cells, the anode, cathode and separator layers are typically prepared individually and thereafter arranged for lamination into electrochemical cells and batteries. In a preferred embodiment, the production process includes the fabrication of an anode/separator (and corresponding cathode/separator) assembly, whereby an anode layer is attached to a separator layer. Thereafter, a battery is produced by stacking these anode/separator and cathode/separator assemblies in alternating fashion and laminating the stack under elevated temperature and pressure. Lamination causes the polymeric binding materials to anneal in order to create a permanent bond at the anode/separator and the cathode/separator interfaces.

In continuous production of electrochemical cells and batteries, the time period between application of the pre-lamination solvent to attachment of the electrode and separator is typically 2 sec. to 10 sec., more preferably about 3 sec. to 5 sec. As is apparent, the pre-lamination solvent must solvate sufficient amounts of the polymer binder within this period of time to provide effective adhesion. Once the surfaces of the electrode and separator layers come into physical contact, the solvent is allowed to evaporate. It is not necessary for the solvent to remain until the annealing or final lamination step wherein sufficient polymer binding material at the electrode/separator interface is melted. The annealing occurs preferably at a temperature of about 110° to 150° C. After the heat treatment, the melted polymers form a matrix upon solidification to produce a strong bond between the electrode and separator. If the pre-lamination solvent is not very volatile, for example, if its boiling point is greater than 150° C., it will remain in the film and will be removed in the extraction step, typically after the cell has been assembled.

Preferred pre-lamination solvents have boiling points that range from about 50° C. to 200° C. at 760 mm of Hg. Pre-lamination solvents that are extremely volatile at ambient temperatures are not preferred since too much of the solvent may evaporate prior to physical contact of the electrode and separator layers. Preferred pre-lamination solvents include, for example, N,N-dimethylformamide (DMF), N,N-dimethylacetamide, 1,3-dioxolane, methyl ethyl ketone, dioxane, and mixtures thereof. A preferred pre-lamination solvent further includes acetone. Particularly preferred solvent systems comprise, for example: (1) DMF or (2) a mixture of DMF and 1,3-dioxolane, and, optionally, acetone.

Finally, the pre-lamination solvent is preferably removed before the electrochemical cell is activated. Preferably, the pre-lamination solvent is miscible with the extraction fluid for the plasticizer so that extraction removes both solvents in a single step.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability by dense gases. Preferred plasticizers include, for example, dibutyl phthalate, dioctylphthalate, acetates, glymes, and low molecular weight polymers.

In operation, in fabricating a solid polymeric matrix and composite electrode that includes polymeric binders, for example, the plasticizer is first well mixed with a polymer. Preferably the weight ratio of plasticizer to polymer in this mixture is from about 0.1 to about 50, more preferably about 0.5 to about 25, and most preferably about 1 to about 10. Thereafter the plasticizer is removed by extraction and in the process the porous structure is formed.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and solid polymeric matrix.

The term "activation" refers to the placement of an inorganic salt and electrolyte solvent into the porous portions of an electrochemical cell precursor. After activation, the electrochemical cell is charged by an external energy source prior to use.

The term "electrolytic cell" or "electrochemical cell" refers to a composite containing an anode, a cathode and an ion-conducting electrolyte interposed therebetween.

The term "battery" refers to two or more electrochemical cells electrically interconnected in an appropriate series/parallel arrangement to provide the required operating voltage and current levels.

The term "substrate" refers to any suitable film made of material that is compatible with the components of the polymer mixture and electrode mixture. The substrate serves as the vehicle or base onto which the electrode or polymer mixture is applied. Suitable substrates include, for example, paper, e.g., 20 or 24 weight paper, polyester (MYLAR™), polypropylene, polyethylene films and non-woven webs.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from organic polymers, inorganic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. Nos. 5,501,921, 5,498,491, 5,491,039, 5,489,491, 5,482,795, 5,463,179, 5,419,984, 5,393,621, 5,358,620, 5,262,253, 5,346,787, 5,340,669, 5,300,375, 5,294,501, 5,262,253, and 4,908,283, which are incorporated herein. Inorganic monomers are disclosed in U.S. Pat. Nos. 4,247,499, 4,388,385, 4,414,607, 4,394,280, 4,432,891, 4,539,276, and 4,557,985, which are incorporated herein.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and removal of the volatile solvent would result in the formation of a solid electrolyte. In either case, the resulting solid electrolyte would be a homogeneous, single phase product which is maintained upon curing, and does not readily separate upon cooling to temperatures below room temperature.

Preferably, the solid polymeric matrix can be formed by a casting process which does not require the use of monomers or prepolymers, that is, no curing is required. A preferred method employs a copolymer of polyvinylidene difluoride and hexafluoropropylene dissolved in acetone or other suitable solvent. Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate. For electrochemical cells where the cathode comprises vanadium oxides, e.g., $V_6O_{13}$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. For example, the organic carbonate can be non-cyclic carbonates or cyclic aliphatic carbonates. Non-cyclic carbonates include, for example, dimethyl carbonate, diethyl carbonate, methyl ethyl carbonate, dipropyl carbonate and bis(2-methoxyethyl) carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The composite anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), (including copolymers thereof), EAA (ethylene acrylic acid copolymer), EVA (ethylene vinyl acetate copolymer), EAA/EVA copolymers, and the like.

Composite anodes of the present invention preferably comprise a carbon material and a polymeric binder which preferably comprises polymers such as, for example, polyvinylidene difluoride, halogenated hydrocarbon polymers including, for example, poly(vinylidene chloride), poly((dichloro-1,4-phenylene) ethylene), fluorinated urethanes, fluorinated epoxides, fluorinated acrylics, and copolymers thereof. Porous polymer structures are formed when these polymers are first imbued with the plasticizers and then removing the plasticizers therefrom. The composite anode can comprise from about 5% (wt) to about 50% (wt) preferably from about 8% (wt) to about 30% (wt) and more preferably from about 10% (wt) to about 20% (wt) of the polymeric binders. Graphite is a preferred carbon material. The composite anode may also include an electron conducting material such as carbon black.

The composite cathode typically comprises a compatible cathodic material (i.e., insertion compounds) which is any material which functions as a positive pole in a solid electrolytic cell. Such compatible cathodic materials are well known in the art and include, by way of example, transition polymeric adhesive materials, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$ and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide material selected from $Li_xNiO_2$ and $Li_xCoO_2$ wherein $0<x\leq2$. Blends can also include $Li_y$-α-$MnO_2$ ($0\leq y<1$) that has a hollandite-type structure and is described in U.S. Pat. No. 5,561,007, which is incorporated herein.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the composite cathode is prepared from a composite cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like. Preferably, the composite cathode can comprise from about 3% (wt) to about 50% (wt), preferably from about 8% (wt) to about 30% (wt), and more preferably from about 10% (wt) to about 20% (wt) of the polymeric binder.

The composite cathode further comprises from about 0 to about 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a solid matrix forming monomer or partial polymer thereof. An ion conducting amount of an inorganic ion salt may also be included. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent based on the total weight of the electrolyte; preferably from about 60 to about 80 weight percent; and even more preferably about 70 weight percent.

A solid electrolyte composition typically comprises from about 5 to about 30 weight percent of the solid polymeric matrix based on the total weight of the electrolyte; preferably from about 15 to about 25 weight percent.

In a preferred embodiment, the solid electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

Methodology

Electrochemical cells are known in the art. See, for example, U.S. Pat. Nos. 5,300,373, 5,316,556, 5,346,385, 5,262,253, 4,472,487, 4,668,595, 5,028,500, 5,584,893, and U.S. patent application Ser. No. 08/630,985 entitled "Method and Apparatus For Preparing Electrochemical Cells" filed Apr. 12, 1996, all of which are incorporated herein. The inventive method can be adapted to prepare anode/electrolyte and cathode/electrolyte cell assemblies suitable for prior art electrochemical devices. In preparing an electrode/cell assembly, the electrolyte or separator layer is prepared by applying a layer of a polymer mixture onto a substrate and removing solvent from the layer of polymer mixture. The polymer mixture comprises a polymer, a solvent, and a plasticizer.

Similarly, the electrode layer is prepared by applying a layer of electrode mixture onto the a substrate and removing solvent from the layer of electrode mixture. The electrode mixture comprises an electrode active material, a polymer, a solvent, and a plasticizer.

The anode generally comprises an anode film that is laminated onto one or both sides of the current collector. Similarly, the cathode generally comprises a cathode film that is laminated onto one or both sides of the current collector. The current collector comprises, for example, a screen, grid, expanded metal, foil, woven or non-woven fabric or knitted wire formed from an electron conductive material such as metals or metal alloys. The term "current collector" refers to any suitable metallic current collector. Current collectors in the form of grids are preferred. Each current collector is also preferably connected to a current collector tab which extends from the edge of the current collector. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

The following examples illustrate methods of how an electrolytic cell could be fabricated with the inventive process. Examples 1 and 2 describe the process of preparing the anode and cathodes, respectively. Example 3 describes the procedures for fabricating a solid electrolytic cell.

EXAMPLE 1

The anode current collector employed was a sheet of expanded copper metal that is about 50 μm thick. It is available under the designation Delker #2 Cu5-125 (flatten) Delker Corp., Branford, Conn. Both surfaces of the anode current collector are coated with an anode layer that is formed from an anode slurry that is applied to a substrate. The anode slurry is prepared as follows:

A polymer mixture comprising a copolymer of vinylidene difluoride (VDF) and hexafluoropropylene (HFP) is prepared by mixing 23.3 grams of the copolymer in 100 ml of acetone. The copolymer (ave. melt viscosity 23,000–27,000 poise) is Kynar Flex 2801™ from Elf Atochem North America, Philadelphia, Pa. The mixture is stirred for about 24 hours in a milling jar available from VWR Scientific, San Francisco, Calif., catalogue No. H-04172-00. The copolymer functions as a binder for the carbon in the anode.

A graphite mixture is prepared separately by first adding 80 grams of graphite into 3.1 grams of carbon black into a solution containing 200 grams acetone, 36 grams dibutyl phthalate, and 0.5 grams of a surfactant. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M. M. M. Carbon, Willbroeck, Belgium. The graphite mixture is then vigorously mixed in a high shear mixer until a substantially homogeneous blend is formed. A suitable mixer is available from Ross, Model ME100DLX, Hauppauge, N.Y. operating at a high setting (about 10,000 RPM) for 30 minutes.

The anode slurry is prepared by mixing the polymer mixture and the graphite mixture together under low shear conditions to form the anode slurry wherein the components are well mixed. A portion of the acetone is allowed to evaporate from the slurry before it was laminated onto a substrate. An anode film forms when the remaining portion of the acetone evaporates.

EXAMPLE 2

The cathode current collector employed is a sheet of expanded aluminum that is about 50 μm thick. The aluminum grid is available under the designation 2AL5-077 from Delker Corp. Both surfaces of the cathode current collector are coated with a cathode layer that is applied to a substrate. The cathode slurry is prepared as follows:

A polymer mixture comprising a copolymer of vinylidene difluoride (VDF) and hexafluoropropylene (HFP) is prepared by mixing 26.7 grams of the copolymer in 100 grams of acetone. The copolymer is Kynar Flex 2801™. The mixture is stirred for about 24 hours in a milling jar.

A cathode active material mixture is prepared separately by first adding 173.4 grams of a cathode-active material of $Li_xMn_2O_4$ (spinel) ($0<x\leq2$), 14.7 grams of carbon black (Super P™) into a solution containing 333.3 grams acetone, 51.9 grams dibutyl phthalate, and 0.9 grams of a surfactant. The mixture is then vigorously mixed in the a high shear mixer until a substantially homogeneous blend is formed.

A cathode slurry is prepared by mixing the polymer mixture and the cathode active material mixture together under low shear conditions to form the cathode slurry wherein the components are well mixed. A portion of the acetone is allowed to evaporate from the slurry before it is laminated onto the substrate. A cathode film forms when the remaining portion of the acetone evaporates.

EXAMPLE 3

A solid electrochemical cell is prepared by positioning a separator comprising a polymeric matrix between the anode and cathode and thereafter fusing the structures under moderate pressure and temperature to form an electrochemical cell precursor. The polymeric matrix is formed by casting a polymeric slurry comprising acetone, dibutyl phthalate, silanized fumed $SiO_2$, and the PVDF/HFP copolymer on a substrate and allowing the acetone to evaporate. No curing by radiation is required. The $SiO_2$ is a filler which impart toughness and strength to the film. In addition, it is believed that the $SiO_2$ assists the activation process by creating physico-chemical conditions such that the electrolyte solution quickly and completely fills the pores created by the extraction of the dibutyl phthalate. Preferably, the polymeric slurry is mixed under low shear conditions as not to degrade the copoloymer.

In preparing the polymer mixture for both the anode and cathode slurries, the polymer (or copolymer) should not be subject to high shear so as to be degraded. Furthermore, preferably the polymer or copolymer employed has a high average molecular weight. Preferably the average molecular weight is between 50K to 750K, more preferably 50K to 200K, and most preferably 50K to 120K. Furthermore, it is preferred that polymer or copolymer has a narrow molecular weight have range. Preferably $$\frac{M_n}{M_w} \cong 1.0.$$

FIG. 1 illustrates an apparatus 101, for preparing an electrochemical cell, that includes a first laminating station 103 where an anode current collector 105 is laminated to at least one anode material film 107 on at least one side of the anode current collector is laminated to anode material film 107 on both sides of the anode current collector, to form an anode precursor 109. The anode current collector 105 includes an extending anode tab 111 extending past an edge 113 of the anode film, and the anode material film includes, as discussed above, a first polymer, an intercalation carbon material, and a first plasticizer. The anode tab 111 may be provided by, for example, laminating the anode material film 107 over less than a complete width of the anode current collector 105. The first laminating station 103 includes compressive elements such as nip rollers 115 for continuously laminating the anode current collector 105 to the anode material film or films 107, or compressive elements such as platens for intermittently laminating the anode current collector and the anode material film or films.

The apparatus 101 includes a second laminating station 117, similar to the first laminating station 103. At the second laminating station 117, a cathode current collector 119 is laminated to at least one cathode material film 121 on at least one side of the cathode current collector is laminated to cathode material film on both sides of the cathode current collector, to form a cathode precursor 123. The cathode current collector 119 includes an extending cathode tab 125 extending past an edge 127 of the cathode material film 121, and the cathode material film includes a second polymer, a cathode active material, and a second plasticizer. The cathode tab 125 may be formed in the same manner as the anode tab 111. As with the first laminating station 103, nip rollers 129 or platens or other suitable compressive elements are provided at the second laminating station 117 for laminating the cathode current collector 119 and the cathode material film 121.

A third laminating station 131, identical to the second laminating station 117, is also provided. At the third laminating station 131, a second cathode current collector 133 laminated to at least one second cathode material film 135 on at least one side of the second cathode current collector is laminated to cathode material film on both sides of the second cathode current collector, to form a second cathode precursor 137. The second cathode precursor 137 is the same as the first cathode precursor, such that the second cathode material film 135 includes the second polymer, the cathode active material, and the second plasticizer. Like the first laminating station 103 and the second laminating station 117, the third laminating station 131 is provided with suitable compressive elements such as nip rollers 139 or platens or the like.

The anode precursors 109, the cathode precursors 123, and, if provided, the second cathode precursors 137 may, if desired or necessary, be prepared at a site remote from the site at which the remaining steps in the assembly of the electrochemical cell. The apparatus 101 is described as including the first, second, and third laminating stations 103, 117, and 131 by way of example, not of necessity.

The apparatus 101 includes an assembling station 141. At the assembling station 141, a polymeric layer 143 including a third plasticizer is interposed between the anode precursor 109 and the cathode precursor 123 such that the polymeric layer prevents direct contact between the anode current collector 105 and the cathode current collector 119. If a second cathode precursor 137 is provided, as is preferred, a second polymeric layer 145 is likewise interposed between the anode precursor 109 and the second cathode precursor, on a side of the anode precursor opposite the first cathode precursor 123.

At the assembling station 141, the anode precursor 109, the first polymeric layer 143, the cathode precursor 123, the second polymeric layer 145, and the second cathode precursor 137 are all sprayed, by one or more sprayers 147, with a pre-lamination solvent, the anode precursor, the first polymeric layer, the cathode precursor, the second polymeric layer, and the second cathode precursor sufficiently so that those elements adhere to one another and are not easily displaced relative to one another. The assembly of the polymeric layer, the anode precursor 109, and the cathode precursor 123 and, if provided, the second polymeric layer 145 and the second cathode precursor 137 is performed by a pick and place type of apparatus available from Klöckner Medipak, Clearwater, Fla. The anode precursor 109, the cathode precursor 123, and, if provided, the second cathode precursor 137, as well as the polymeric layer or layers, may be cut by a cutter 148 to a desired size corresponding to a desired amount of power desired and subsequently sprayed with acetone, or may be first sprayed with acetone and joined, and then cut to size. The polymeric layer does not have to be sprayed with a polymer binder in order to be laminated to the anode or cathode bicell. Following extraction of the plasticizer, the battery is activated.

Solvent systems comprising N,N-dimethylformamide and/or acetone as set forth in the following table were sprayed onto a cathode surface of a cathodic film comprising the components described in Example 1. The cathode surface had an area of approximately 18 $cm^2$ and approximately 40 µl of solvent was employed. A separator layer comprising a polymeric matrix of VDF/HFP copolymer was then pressed onto the cathode surface for 3 seconds. The laminated layers were then lifted by the separator and shook by hand. Excellent adhesion in the case of DMF alone was evident as the laminant did not separate despite being shaken for 5 seconds. Poor adhesion in the case of acetone alone was evident when the laminant separated upon being lifted.

| DMF, parts (wt) | Acetone, parts (wt) | Degree of adhesion |
|---|---|---|
| 1 | 0 | excellent |
| 2 | 1 | very good |
| 1 | 1 | good |
| 1 | 2 | fair |
| 1 | 3 | poor |
| 0 | 1 | no adhesion |

It was also demonstrated that lamination of separator and cathode layers with a solvent comprising DMF and acetone (3:1 ratio) that was applied to the cathode surface produced good adhesion. In addition, no gaseous pre-lamination solvent in the form of bubbles, was detected. Such bubbles would adversely affect electrochemical performance.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A method of preparing an electrode/separator assembly that comprises the steps of:

forming an electrode film that comprises a first polymer and an electrode active material;

forming a separator film that comprises a second polymer; and attaching the electrode film to the separator film by a process comprising:

(i) placing a pre-lamination solvent on either a first surface of the electrode film, first surface of the separator film, or on both surfaces, wherein the pre-lamination solvent is effective in solvating polymer on the surface of either film; and (ii) placing the first surface of the electrode film in contact with the first surface of the separator film to form an electrode/separator assembly.

2. The method of claim 1 wherein the pre-lamination solvent has a boiling point higher than about 50° C. at 760 mm of Hg.

3. The method of claim 1 wherein the pre-lamination solvent has a boiling point that ranges from about 50° C. to about 200° C. at 760 mm of Hg.

4. The method of claim 1 wherein the pre-lamination solvent is selected from the group consisting of N,N-dimethylformamide, N,N-dimethylacetamide, 1,3-dioxolane, methyl ethyl ketone, dioxane and mixtures thereof.

5. The method of claim 1 wherein the first polymer and second polymer comprise a copolymer of vinylidenedifluoride and hexafluoropropylene.

6. The method of claim 5 wherein the pre-lamination solvent is selected from the group consisting of N,N-dimethyl formamide, N,N-dimethylacetamide, 1,3-dioxolane, and mixtures thereof.

7. The method of claim 4 wherein the pre-lamination solvent further comprises acetone.

8. The method of claim 1 further comprising heating the electrode/separator assembly to a temperature in the ranges of about 50° C. to about 200° C.

9. The method of claim 1 wherein the electrode active material is an intercalation carbon material is selected from the group consisting of graphite, coke, mesocarbon, and mixtures thereof.

10. The method of claim 1 wherein the electrode active material is a cathode active material is selected from lithiated manganese oxides, lithiated cobalt oxides, lithiated nickel oxides and mixtures thereof.

11. The method of claim 1 wherein the pre-lamination solvent is placed on the first surface of the electrode film.

12. A method of fabricating an electrochemical cell including an anode, a cathode, and a polymeric separator layer positioned between the anode and the cathode which comprises the steps of:

(a) preparing a cathode film comprising a cathode active material and a first polymer;

(b) preparing a separator film that comprises a second polymer;

(c) preparing a cathode/separator assembly by a process that comprises the steps of:

(i) placing a pre-lamination solvent on either a first surface of the cathode film, first surface of the separator film, or both surfaces, wherein the pre-lamination solvent is effective in solvating polymer on the surface of the either film; and (ii) placing the first surface of the cathode film in contact with the first surface of the separator film; and (d) attaching an anode film comprising an anode active material and a third polymer to a surface of the separator of the cathode/separator assembly.

13. The method of claim 12 wherein the pre-lamination solvent has a boiling point of higher than about 50° C. at 760 mm of Hg.

14. The method of claim 1 wherein the pre-lamination solvent has a boiling point that ranges from about 50° C. to about 200° C. at 760 mm of Hg.

15. The method of claim 12 wherein the pre-lamination solvent is selected from the group consisting of N,N-dimethyl formamide, N,N-dimethylacetamide, 1,3-dioxolane, methyl ethyl ketone, dioxane and mixtures thereof.

16. The method of claim 12 wherein the first polymer, second polymer, and third polymer comprise a copolymer of vinylidenedifluoride and hexafluoropropylene.

17. The method of claim 16 wherein the pre-lamination solvent is selected from the group consisting of N,N-dimethyl formamide, N,N-dimethylacetamide, 1,3-dioxolane and mixtures thereof.

18. The method of claim 15 wherein the pre-lamination solvent further comprises acetone.

19. The method of claim 12 wherein the cathode film, anode film, and the separator film comprise a plasticizer and the method further comprises the step of removing the plasticizer the pre-lamination solvent and then adding a solution comprising an electrolyte solvent and salt into the separator film.

20. The method of claim 12 wherein the anode active material is an intercalation carbon material is selected from the group consisting of graphite, coke, mesocarbon, and mixtures thereof and wherein the cathode active material is selected from lithiated manganese oxides, lithiated cobalt oxides, lithiated nickel oxides and mixtures thereof.

21. The method of claim 12 further comprising heating the cathode/separator assembly to a temperature in the range from about 50° C. to about 200° C.

22. The method of claim 12 further comprising the step of adding an electrolyte solvent and salt to the separator film.

23. A method of fabricating an electrochemical cell including an anode, a cathode, and a polymeric separator layer positioned between the anode and the cathode which comprises the steps of:

(a) preparing anode film comprising an anode active material and a first polymer;

(b) preparing a separator film that comprises a second polymer;

(c) preparing an anode/separator assembly by a process that comprises the steps of:

(i) placing a pre-lamination solvent on either a first surface of the anode film, first surface of the separator film, or both surfaces, wherein the pre-lamination solvent is effective in solvating polymer on the surface of the either film; and (ii) placing the first surface of the anode film in contact with the first surface of the separator film; and (d) attaching a cathode film comprising a cathode active material and a third polymer to a surface of the separator of the anode/separator assembly.

24. The method of claim 23 wherein the pre-lamination solvent has a boiling point higher than about 50° C. at 760 mm of Hg.

25. The method of claim 23 wherein the pre-lamination solvent is selected from the group consisting of N,N-dimethyl formamide, N,N-dimethylacetamide, 1,3-dioxolane, methyl ethyl ketone, dioxane and mixtures thereof.

26. The method of claim 23 wherein the first polymer, second polymer, and third polymer comprise a copolymer of vinylidenedifluoride and hexafluoropropylene.

27. The method of claim 26 wherein the pre-lamination solvent is selected from the group consisting of N,N-dimethyl formamide, N,N-dimethylacetamide, 1,3-dioxolane and mixtures thereof.

28. The method of claim 25 wherein the pre-lamination solvent further comprises acetone.

29. The method of claim 23 wherein the cathode film, anode film, and the separator film comprise a plasticizer and the method further comprises the step of removing the plasticizer and the pre-lamination solvent and then adding a solution comprising an electrolyte solvent and salt into the separator layer.

30. The method of claim 23 wherein the anode active material is an intercalation carbon material is selected from the group consisting of graphite, coke, mesocarbon, and mixtures thereof and wherein the cathode active material is selected from lithiated manganese oxides, lithiated cobalt oxides, lithiated nickel oxides and mixtures thereof.

31. The method of claim 23 further comprising heating the anode/separator assembly to a temperature in the range from about 50° C. to about 200° C.

32. The method of claim 23 further comprising the step of adding an electrolyte solvent and salt to the separator film.

* * * * *